(12) United States Patent
Cooper et al.

(10) Patent No.: US 7,284,004 B2
(45) Date of Patent: Oct. 16, 2007

(54) SUMMARIZATION OF DIGITAL FILES

(75) Inventors: Matthew L. Cooper, San Francisco, CA (US); Jonathan T. Foote, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 423 days.

(21) Appl. No.: 10/271,407

(22) Filed: Oct. 15, 2002

(65) Prior Publication Data

US 2004/0073554 A1 Apr. 15, 2004

(51) Int. Cl.
*G06F 17/10* (2006.01)
(52) U.S. Cl. .................................................. 707/100
(58) Field of Classification Search ............... 707/100; 704/200

See application file for complete search history.

(56) References Cited

U.S. PATENT DOCUMENTS

| | | | |
|---|---|---|---|
| 5,227,892 A | 7/1993 | Lince | 358/335 |
| 5,598,507 A | 1/1997 | Kimber et al. | 395/2.55 |
| 5,630,125 A * | 5/1997 | Zellweger | 707/103 R |
| 5,655,058 A | 8/1997 | Balasubramanian et al. | 395/2.65 |
| 5,659,662 A | 8/1997 | Wilcox et al. | 395/2.54 |
| 5,671,294 A * | 9/1997 | Rogers et al. | 382/228 |
| 5,828,994 A | 10/1998 | Covell et al. | 704/211 |
| 5,918,223 A | 6/1999 | Blum et al. | 707/1 |
| 6,058,211 A * | 5/2000 | Bormans et al. | 382/235 |
| 6,542,869 B1 | 4/2003 | Foote et al. | 704/500 |
| 2002/0051077 A1* | 5/2002 | Liou et al. | 348/465 |
| 2002/0054074 A1* | 5/2002 | Sugano et al. | 345/730 |

OTHER PUBLICATIONS

Rudolf K Bock, Singular Value Decomposition, Apr. 7, 1998, Retreved on Mar. 02, 2005 from http://rkb.home.cern.ch/rkb/AN16pp/node265.html, 1 page.*

U.S. Appl. No. 09/947,385, filed Sep. 7, 2001, Foote.

Arons, B., "SpeechSkimmer: A System for Interactively Skimming Recorded Speech," *ACM Trans. on Computer Human Interaction*, Mar. 1997, vol. 4, No. 1, pp. 3-38. (http://www.media.mit..edu/~barons/tochi97.html).

Bregman, A. S., *Auditory Scene Analysis: Perceptual Organization of Sound*, MIT Press, Cambridge, MS, 1990.

Stephen Chu, et al., *Music Summary Using Key Phrases*, Proc. IEEE International Conference on Acoustics, Speech and Signal Processing, 2000, no pages given.

T. Cover, et al., Elements of Information Theory, John Wiley & Sons, 1991, pp. 18-19.

Ross Cutler, et al., *Robust Real-Time Periodic Motion Detection, Analysis, and Applications*, IEEE Trans. Pattern Analysis and Machine Intelligence, vol. 22, No. 8, 2000, pp. 781-796.

(Continued)

*Primary Examiner*—Zoila Cabrera
*Assistant Examiner*—Luke Osborne
(74) *Attorney, Agent, or Firm*—Fliesler Meyer LLP (57) ABSTRACT

Embodiments of the present invention provide a method for producing a summary of a digital file on one or more computers. The method includes segmenting the digital file into a plurality of segments, clustering said segments into a plurality of clusters and selecting a cluster from said plurality of clusters wherein said selected cluster includes segments representative of said digital file. Upon selection of a cluster a segment of the cluster is provided as a summary of said digital file.

16 Claims, 5 Drawing Sheets

OTHER PUBLICATIONS

R. Duda, et al., Pattern Recognition and Scene Analysis, John Wiley & Sons, 1973, pp. 228-237.

Eckmann, J.P. et al., "Recurrence Plots of Dynamical Systems," *Europhys. Lett.*, vol. 4 (9), pp. 973-977, Nov. 1, 1987.

Foote, J., "Content-Based Retrieval of Music and Audio," *SPIE*, 1997, vol. 3229, pp. 138-147.

Foote, J., "Visualizing Music and Audio Using Self-Similarity," *ACM Multimedia '99*, Oct. 1999, Orlando, Florida.

Foote, J.T. and Silverman, H.F., "A Model Distance Measure for Talker Clustering and Identification," pp. I-317-I-320, Apr. 1994, IEEE.

Foote, Jonathan *Automatic Audio Segmentation Using a Measure of Audio Novelty*, Proc. IEEE ICME 2000, pp. 452-455.

D. Forsyth, et al., Computer Vision—A Modern Approach, Chapter 16, "Segmentation Using Clustering Methods," Prentice-Hall, pp. 433-466, http://www.cs.berkeley.edu/~daf/book.html, no date.

D. Forsyth, et al., Computer Vision—A Modern Approach, Chapter 16, "Segmentation Using Clustering Methods," Prentice-Hall, pp. 433-466, http://www.cs.berkeley.edu/~daf/book.html, no date.

Gish et al., "Segregation of Speakers for Speech Recognition and Speaker Identification," *IEEE*, Jul. 1991, vol. 2, pp. 873-876.

Yihong Gong, et al., *Video Summarization Using Singular Value Decomposition*, Proc. IEEE CVPR, 2000, pages given.

Goto, M. and Muraoaka, Y., "A Beat Tracking System for Acoustic Signals of Music," *Proc. ACM Multimedia* 1994, San Francisco, ACM, pp. 365-372.

Thomas Hofmann, *Unsupervised Learning by Probabilistic Latent Semantic Analysis*, Machine Learning, 42, 2001, pp. 177-196.

Johnson, P., "sci-skeptic FAQ.: The Frequently Questioned Answers" http://www.faqs.org/faqs/skeptic-faq/index.html, Apr. 21, 1996.

Kimber, D. and Wilcox, L., "Acoustic Segmentation for Audio Browsers," in *Proc. Interface Conference*, Sydney, Australia, 1996, 10 pp.

Daniel D. Lee, et al., *Learning the Parts of Objects by Non-Negative Matrix Factorization*, Nature, vol. 401, Oct. 21, 1999, p. 788-791.

Rabiner, L. and Juang, B.-H., *Fundamentals of Speech Recognition*, PTR, Prentice Hall, Englewood Cliffs, New Jersey, 1993, no pages given.

Scheirer, E.D., "Tempo and Beat Analysis of Acoustic Musical Signals," *J. Acoust. Soc. Am.*, vol. 103, No. 1, Jan. 1998, pp. 588-601.

Scheirer, E.D., Using Musical Knowledge to Extract Expressive Performance Information from Audio Recordings, Sep. 30, 1996, Nikos Drakos, Computer Based Learning Unit, University of Leeds (http://sound.media.mit.edu/~eds/papers/html/ijcai95/), no pages given.

Shepard, R., "Representations of Structure in Similar Data: Problems and Prospects," *Psychometrica*, Dec. 1974, vol. 39, No. 4, pp. 373-421.

Siu et al., "An Unsupervised, Sequential Learning Algorithm for the Segmentation of Speech Waveforms with Multiple Speakers," IEEE, Sept. 1992, pp. II-189-II-192.

Slaney, M., "Auditory Toolbox," Jan. 19, 1999, (http://sound.media.mit.edu/dpwe-bin/mhmessage.cgi/AUDITORY/postings/1999/21), no pages given.

Sprenger, S., "Time and Pitch Scaling of Audio Signals," Nov. 1999, http://www.dspdimension.com/html/timepitch.html.

Lisa Stifelman, et al., *The Audio Notebook: Paper and Pen Interaction With Structured Speech*, Proc. ACM CHI 2001, vol. 3, No. 1, pp. 182-189.

G. Strang, Linear Algebra and its Applications, Harcourt, Brace, Jovanovich, 1988, pp. 432-451.

Sugiyama et al., "Speech Segmentation and Clustering Based on Speaker Features," IEEE, Apr. 1993, pp. II-395-II-398.

Kah-Kay, Tomaso Poggio; *Example-based Learning for View-based Human Face Detection*, A.I. Memo No. 1521, C.B.C.L. Paper No. 112, Massachusetts Institute of Technology, Artificial Intelligence Laboratory and Center for Biological and Computational Learning; Dec. 1994, no pages given.

Kah-Kay Sung, Tomaso Poggio; *Example-Based Learning for View-Based Human Face Detection*, IEEE Transactions on Pattern Analysis and Machine Intellignece, vol. 20, No. 1, Jan. 1998.

George Tzanetakis, et al., *Audio Information Retrieval(AIR) Tools*, Proc. International Symposium on Music Information Retrieval, 2000.

Yair Weiss, *Segmentation Using Eigenvectors: A Unifying View*, Proc. IEEE ICCV 1999, pp. 975-982.

H. Zabrodsky, S. Peleg, D. Avnir; *Symmetry as a Continuous Feature*, Institute of Computer Science, The Hebrew University of Jerusalem; 91904 Jerusalem, Israel, no pages, no date.

\* cited by examiner

SUMMARIZATION OF DIGITAL FILES

FIELD OF THE INVENTION

The present invention is related to the field of digital file summarization, and more particularly to the field of automatic digital file summarization.

BACKGROUND

Digital format is becoming an increasingly popular form for storing all types of information. For example, music, audio, video, and multimedia may be stored in digital formats.

With the advent of the Internet and the multitude of peer-to-peer services, such as Napster, individuals routinely assemble large collections of digital files on their personal digital devices. For example, a recent poll on the collection of MPEG-Layer 3 ("MP3") files stored on individuals digital devices illustrated that a quarter of the respondents' collections contain at least nine gigabytes of digital audio.

As a result of the massive growth in the size of these personal collections, research and development tools supporting file management has become increasingly active. For example, providing summaries of digital music has become a key area in this field. Given summaries of MP3 files, users can navigate and sample music databases more efficiently, whether browsing music at e-commerce websites or within personal collections. Furthermore, distribution of music summaries in place of complete files bypasses many security concerns of content providers.

Currently techniques for generating music summaries frequently produce summaries that do not adequately represent the piece of music being summarized. For example, one technique for summarizing a piece of music divides the piece into fixed length time segments and analyzes each segment, groups the segments into clusters and then selects a segment from one of the clusters as the summary. However, this technique frequently segments the piece at undesirable locations and selects a segment of the piece that does not adequately represent the piece of music.

Therefore, it is desirable to Produce a system and method that automatically summarizes a digital file on one or more computers, such as a music file, and generates a summary that adequately represents that digital file.

SUMMARY

Roughly described, the invention comprises a method and system for producing a summary of a digital file on one or more computers. In an embodiment, the method includes segmenting the digital file into a plurality of segments, clustering said segments into a plurality of clusters and selecting one or more clusters from said plurality of clusters wherein said selected cluster(s) includes segments representative of said digital file, according to selected criteria for determining representative segments. One or more segments is then selected from each cluster and combined as a summary of said digital file.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

Figure 1:
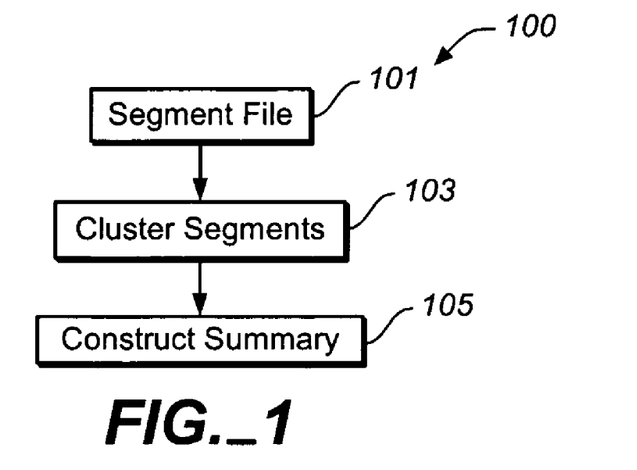
FIG. 1 illustrates a general overview of a method performed for generating a summary of a digital file, according to an embodiment of the invention.
Figure 2:
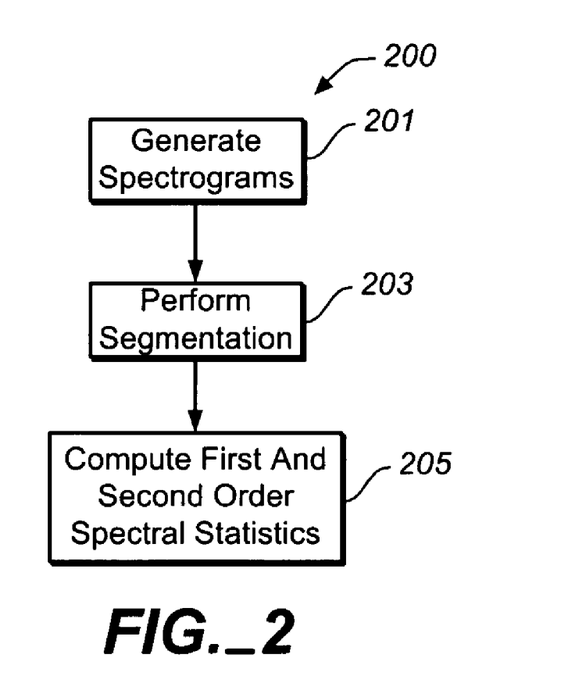
FIG. 2 illustrates a process for generating segments of a digital file, according to an embodiment of the invention.
Figure 6:
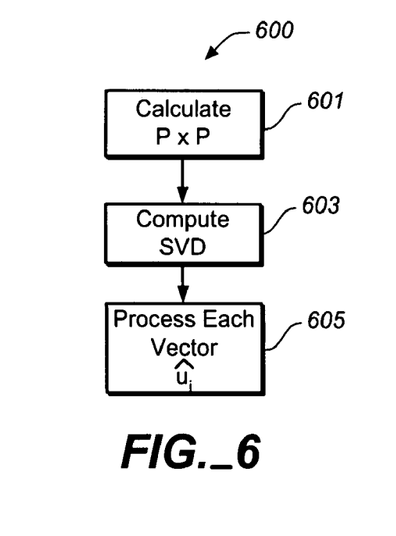
FIG. 6 illustrates a method for clustering segments according to an embodiment of the invention; and, FIG. 7 illustrates the segmentation results for the song "Wild Honey" by U2.

FIG. 1 illustrates a general overview of a method performed in generating a summary of a digital file, according to an embodiment of the invention. As one who is skilled in the art would appreciate, FIGS. 1, 2, and 6 illustrate logic boxes for performing specific functions. In alternative embodiments, more or fewer logic boxes may be used. In an embodiment of the present invention, a logic box may represent a software program, a software object, a software function, a software subroutine, a software method, a software instance, a code fragment, a hardware operation or user operation, singly or in combination.

Upon initiation, a digital file is segmented 101 by detection of locally novel points. After segmentation the segments are clustered 103 by statistical analysis of their spectral characteristics. Finally, a summary is constructed 105 using the segmentation and cluster analysis. The summarization may also utilize application-specific information or user-specific preferences in generating the summary.

Audio Segmentation

Segments of a file may be generated using several different segmentation techniques. For example, FIG. 2 illustrates a process 200 for generating segments of a file, according to an embodiment of the invention. In logic box 201 computation of a digital file is performed to generate spectrograms. Subsequently, as illustrated by logic box 203, the spectrograms are used to perform a segmentation of the digital file using an efficient method based on spectral "self-similarity," as will be described in detail below. Given the segmentation first and second order spectral statistics of each segment are computed 205 from the spectrograms. Each segment may be of varying length.

"Self-similarity" is a non-parametric technique for assessing the global structure of time-ordered multimedia streams. In an embodiment, self-similarity is determined at two hierarchical levels. In the segmentation step, an incomplete time-indexed similarity matrix is computed and processed to detect locally novel audio time samples. Given the segmentation boundaries, a complete segment-indexed similarity matrix of substantially lower dimension is calculated. For this, a statistical similarity measure is introduced by which the similarity of variable length media segments may be quantitatively assessed. The use of statistical, segment-level analysis improves the robustness of the clustering while drastically reducing the computational requirements compared to existing techniques.

Figure 3A:
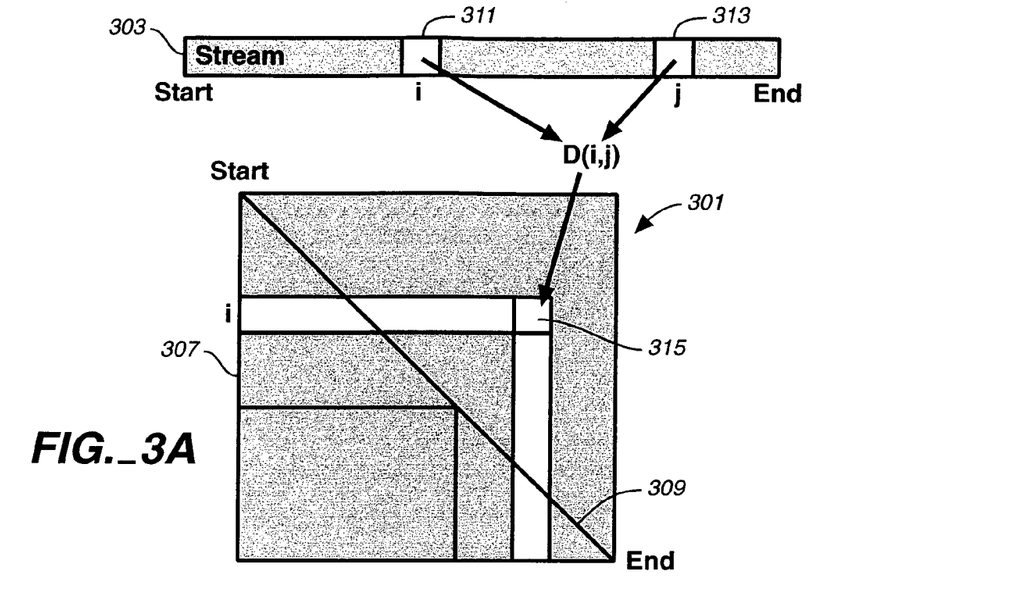
FIG. 3 illustrates similarity matrices produced according to an embodiment of the invention.

In an embodiment, the self-similarity analysis of digital data is accomplished by comparing each media segment to all other media segments using a similarity measure. For example, for N samples of a digital audio file, each sample may be represented by the B-dimensional feature vectors $\{v_i: i=1, \ldots, N\} \subset \mathbb{R}^B$ for a generic similarity measure, d: $\mathbb{R}^B \times \mathbb{R}^B \to \mathbb{R}$. The resulting similarity data may be embedded in a matrix S 301, as illustrated in FIG. 3. The elements of the initial digital file 303 are illustrated as $S(ij)=d(v_i, v_j)$ i,j=1, . . . , N. The time axis runs on the horizontal 305 and vertical 307 axes of S and along its main diagonal 309, where self-similarity is maximal.

Figure 3B:
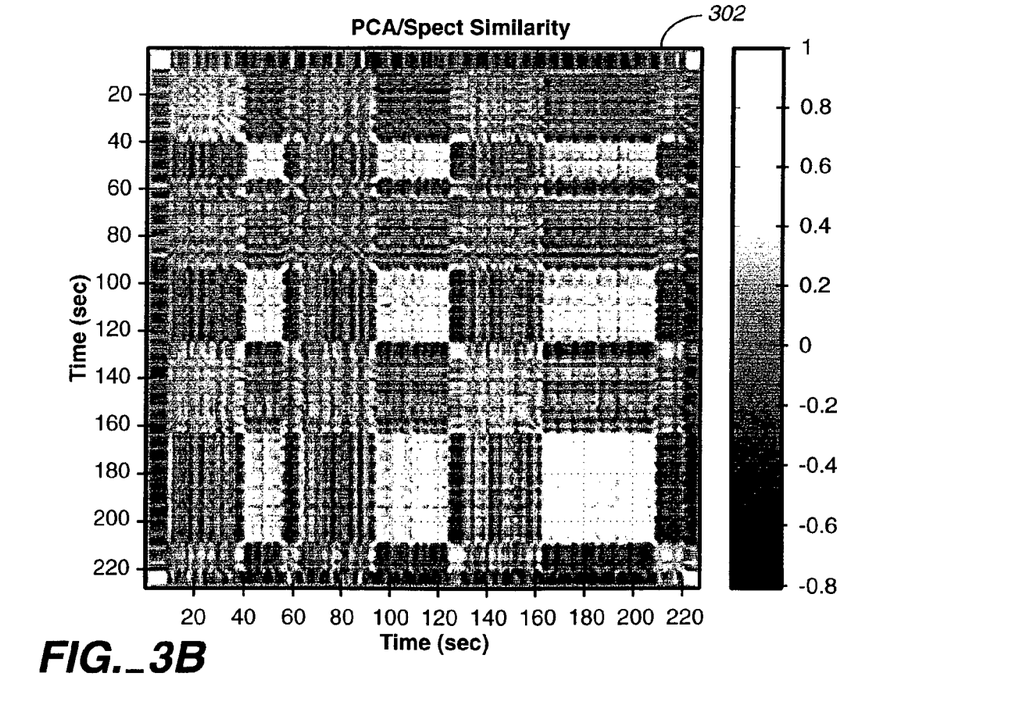

Matrix 301 is generated by comparing each media element 311, 313 of digital file 303. The similarity value 315 is represented in matrix 301 as degree of color. Referring to FIG 3B, matrix 302 illustrates a simailarity matrix computed for the song "Wild Honey" by U2 analyzed according to an embodiment of the invention. As shown in FIG. 3A elements in the stream of data of a digital file are compared with other elements in the stream of data and the information is compiled in a matrix. The resulting matrix (see FIG 3B) indicates regions of similarity between the elements. A lighter color (white) is used for high similarity and increasingly darker shades (black) are used when the element is compared with a dissimilar element. The leading diagonal from the top left corner to the bottom right corner traces the comparison of each element With itself. As a result of the similarity of each element to itself, this leading diagonal shows a white line. In FIG 3B. regions of similarity are shown as light-gray squares. Based on the similarity matrix it is possible to see regions of similarity of an element compared with other elements close to that element (gray square regions close to or on the leading diagonal) and at a distance from that element (gray square regions at a distance away from the leading diagonal).

It will be understood that alternative parameterization may also be employed for segmenting a digital file. For example, the Mel Frequency Cepstral Coefficients ("MFCC"), or subspace representations computed using singular value decomposition ("SVD") of the data may be used. Other techniques, such as Probabilistic Latent Semantic Analysis ("PLSA") as described in "*Unsupervised Learning by Probabilistic Latent Semantic Analysis*," MACHINE LEARNING, 42, 177-196, 2001, by T. Hofmann, or Non-Negative Matrix Factorization ("NMF") as described in "*Learning the parts of objects by non-negative matrix factorization*," NATURE, Vol. 401, 21 October 1999, by D. Lee, et al., may also be used. The window size may also be varied. However, robust audio analysis typically requires resolution on the order of 0.05 seconds.

Segmentation 101 may also be accomplished by comparing the spectral information using cosine distance measures. Given vectors $V_i$ and $V_j$ representing the spectrograms for sample times i and j, respectively, $$d_{\cos}(v_i, v_j) = \frac{<v_i, v_j>}{|v_i||v_j|}. \quad (1)$$

Figure 4A:
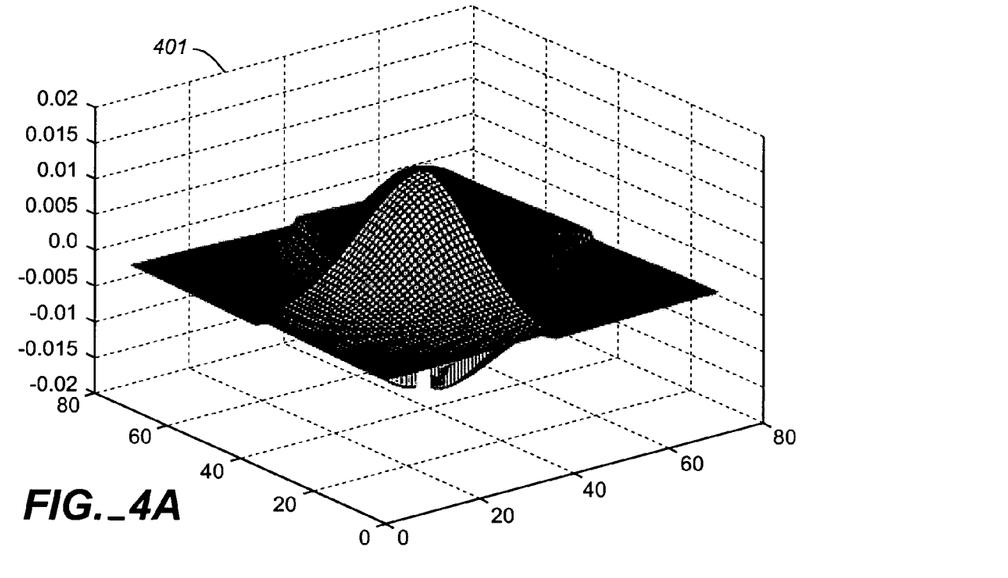
FIG. 4 illustrates a Gaussian-tapered checkerboard kernel and a kernel correlation computed according to an embodiment of the invention.
Figure 4B:
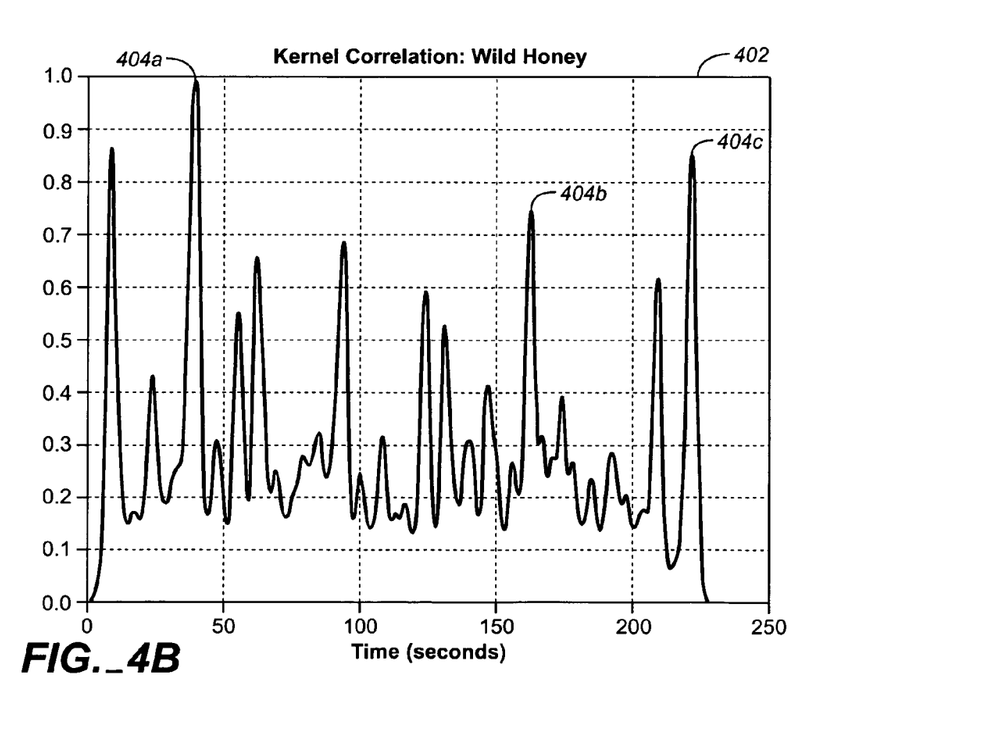

For example, consider a digital audio stream comprised of N samples. This information is embedded in a similarity matrix, S, with elements given by (1). To detect novel points in the file, a Gaussian-tapered checkerboard kernel is correlated along the main diagonal of the similarity matrix. A complete discussion on detecting novelty score can be found in co-pending U.S. application Ser. No. 09/569,230, filed May 11, 2000, entitled METHOD FOR AUTOMATIC ANALYSIS OF AUDIO INCLUDING MUSIC AND SPEECH, which is incorporated herein by reference. FIG. 4A illustrate a Gaussian-tapered checkerboard kernel 401 used in audio segmentation. In FIG. 4A, logic box 402 is the kernel correlation computed from the similarity matrix 302 in FIG. 3. FIG. 4B depicts the sample-indexed novelty score produced by correlating the checkerboard kernel along the leading diagonal of the similarity matrix 302 in FIG. 3. In FIG. 4B, large peaks (e.g., 404*a*, 404*b*, 404*c*) are detected in the resulting sample-indexed correlation and labeled as segment boundaries.

For segmentation, the similarity matrix is calculated around the main diagonal with the width of the checkerboard kernel. Using a simple change of variables an N×K matrix $\hat{S}$ is computed such that $$\hat{S}(i, l) = S\left(i, i+l-\left\lfloor \frac{K}{2} \right\rfloor\right) \quad i=1, \ldots, N \quad l=1, \ldots, K.$$

By considering only the matrix elements within the bandwidth of K=256 centered around the main diagonal, the computational requirements are reduced by over 96% for a three-minute audio file sampled at 20 Hertz. However, it is understood that K may be set to any other desired value. If a symmetric similarity measure is used, the remaining computation can be reduced still further.

Regardless of the type of segmentation utilized, the output may be represented as a set of segments, $\{p_i, \ldots, p_p\}$. Each segment is determined by a start time and an end time. In an embodiment, segments may be of varying length and are not predefined, thereby allowing the system to more accurately generate a segment representative of the song.

Statistical Segment Clustering

In logic box 103 the segments are clustered to determine dominant clusters and their representatives for summarization. For clustering, a second similarity matrix, denoted $S_S$, is computed which quantifies similarity at the segment level. To assess segment similarity, the time-indexed set of spectrogram vectors $\{vi: i=1 \ldots N\} \subset \mathbb{R}^B$ is computed. For the matrix the B×1 empirical mean vector and B×B empirical covariance matrix for the spectrogram data in each segment is computed. The segments are clustered using a similarity measure. Similarity measure may be determined using different techniques. For example, a similarity measure may be determined based on a cosine distance between the segments' empirical mean. In another embodiment, similarity measure may be determined based on the Kullback-Leibler ("KL") distance between Gaussian densities characterized by the segment's empirical mean and co-variance. For example, let $G(\mu, \Sigma)$ denote the B-dimensional Gaussian density determined by the mean vector $\mu$ and covariance matrix $\Sigma$. The KL distance between the B-dimensional densities $G(\mu_i, \Sigma_j)$ is $$d_{KL}\left(G\left(\mu_i, \sum_i\right) \middle\| G\left(U_j, \sum_j\right)\right) = \frac{1}{2}\log\left(\frac{|\Sigma_j|}{|\Sigma_i|}\right) + \frac{1}{2}Tr\left(\sum_i \sum_j^{-1}\right) + \frac{1}{2}(\mu_i - \mu_j)^t \sum_j^{-1}(\mu_i - \mu_j) - \frac{B}{2} \quad (3)$$

where Tr denotes the matrix trace. For a B×B matrix A, $$Tr(A) \equiv \sum_{i=1}^{B} A_{ii}.$$

The KL distance is not symmetric, but a symmetric variation may be constructed as $$\hat{d}_{KL}\left(G\left(\mu_i, \sum_i\right) \middle\| G\left(\mu_j, \sum_j\right)\right) \equiv d_{KL}\left(G\left(\mu_i, \sum_i\right) \middle\| G\left(\mu_j, \sum_j\right)\right) + \quad (4)$$

$$d_{KL}\left(G\left(\mu_j, \sum_j\right) \middle\| G\left(\mu_i, \sum_i\right)\right)$$

$$= \frac{1}{2}\left[Tr\left(\sum_i \sum_j^{-1}\right) + Tr\left(\sum_i^{-1} \sum_j\right) + \quad (5)\right.$$

$$\left.(\mu_i - \mu_j)^t\left(\sum_j^{-1} + \sum_i^{-1}\right)(\mu_i - \mu_j)\right] - B.$$

Each segment $p_i$ is identified with the empirical mean $\mu_i$ and covariance $\Sigma_i$ of its spectrogram data. Segment similarity is assessed by $$d_{seg}(p_i, p_j) = \exp\left(-\hat{d}_{KL}\left(G\left(\mu_i, \sum_i\right) \middle\| G\left(\mu_j, \sum_j\right)\right)\right), \quad (6)$$

where dseg( . , . ) ∈(0,1] and is symmetric.

To cluster the segments, the inter-segment similarity measure of (6) is computed for each pairing of segments. The data may be embedded in a segment-indexed similarity matrix, Ss, analogous to the time-indexed similarity matrices of FIG. 3:

$$S_s(i, j) = d_{seg}(p_i, p_j) \, i, j=1, \ldots, P.$$

Ss is two orders of magnitude smaller in dimension than its time-indexed counterpart. SVD of Ss=UΛV$^t$ is computed where U and V are orthogonal matrices and Λ is a diagonal matrix whose diagonal elements are the singular values of Ss: $\Lambda_{ii}=\lambda_i$. The singular vectors in the columns of U are used to form unit-sum vectors for $$\hat{u}_i = \lambda_i(u_i \circ v_i) \quad (7),$$

where ∘ denotes the element-wise vector product for x, y∈IR$^B$,x∘y=z∈IR$^B$,z(i)y(i),i=1, . . . , B. $u_i$ and $v_i$ denote the $i^{th}$ column of U and V, respectively; for symmetric similarity matrices, U=V. As output of the SVD the columns are ordered by descending singular value, i.e. $u_1$, is the left singular vector corresponding to $\lambda_1$, the largest singular value. The cluster to which each segment belongs is determined according to method 600 described with respect to FIG. 6.

In logic box 601, the process begins by calculating a P×P segment-indexed similarity matrix Ss using (6). Control is then transferred to logic box 603 where the SVD of Ss and the set of vectors {$\hat{u}_i$: i=1, . . . , P} per (7) ordered by decreasing singular values is computed. Each vector $\hat{u}_i$ is scaled to have maximum value one. In logic box 605 each vector $\hat{u}_i$ is processed until each segment is associated with a cluster. To perform the processing the method begins by setting i←1. Each segment whose corresponding index in the vector $\hat{u}_i$ exceeds a predetermined value is joined as a member of cluster i. For example the predetermined value may be 0.05. Next i is set to i←i+1 and the process is repeated while i≦P and there are unclustered segments remaining.

In other embodiments, segments may be clustered using other techniques, such as Probabilistic Latent Semantic Analysis ("PLSA") as described in "*Unsupervised Learning by Probabilistic Latent Semantic Analysis,*" MACHINE LEARNING, 42, 177-196, 2001, by T. Hofmann, or Non-Negative Matrix Factorization ("NMF") as described in "*Learning the parts of objects by non-negative matrix factorization,*" NATURE, Vol. 401, 21 October 1999, by D. Lee, et al., may also be used.

Figure 5A:
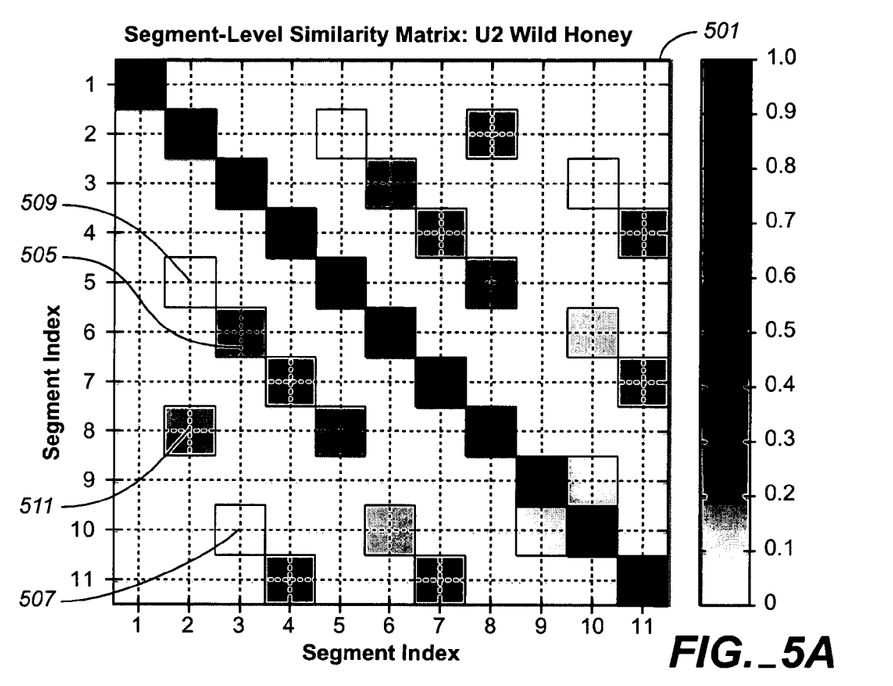
FIG. 5 illustrates cluster indicators, according to an embodiment of the invention.
Figure 5B:
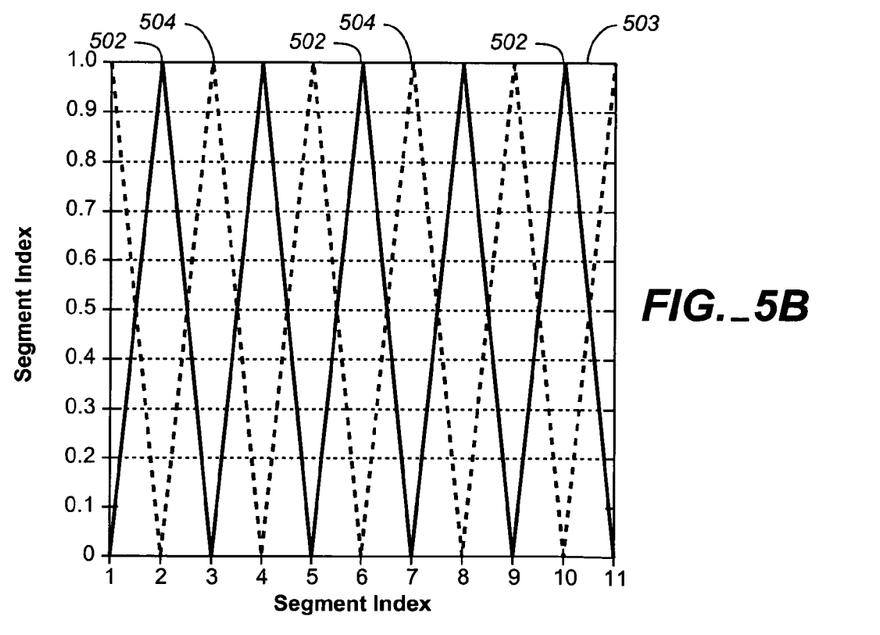

The results for the method 600 for the song "Wild Honey" by U2 are shown in FIG. 5. In FIG. 5A, the segment similarity matrix Ss 501 shows the segment-level similarity. FIG. 5A indicates regions of similarity between the segments. In contrast to FIG. 3B, a dark color (black) is used for high similarity and increasingly lighter shades (white) are used when the segment is compared with a dissimilar segment The leading diagonal from the top left corner to the bottom right corner traces the comparison of each segment with itself. As a result of the similarity of each segment to itself, this leading diagonal shows a line of black squares. In FIG. 5A, regions of lesser similarity are shown as gray squares. Based on the similarity matrix it is possible to see regions of similarity of a segment compared with other segments close to that segment (gray square regions above and below the leading diagonal) and at a distance from that segment (gray square regions at a distance away from the leading diagonal). In FIG. 5B, diagram 503 illustrates the resulting segment-indexed cluster indicators computed for the û vectors of(7).

For the song "Wild Honey" by U2, the time index similarity matrix generated using a segmentation algorithm is initially 4,540×4,540. Matrix 501 illustrates the corresponding 11×11 segment index similarity matrix for the time index similarity matrix for the song "Wild Honey." The segment index matrix 501 represents the corresponding 11 segments. Each segment is represented in a horizontal row 1-11 and a corresponding vertical column 1-11. Segments that are similar are represented with a grayish color at their intersecting points. For example, segment index 3 and segment index 6 are similar and have a darkened intersecting point 505. Segment index 3 is also similar to segment index 10 and is illustrated by a darkish gray intersecting point 507. Likewise, segment index 2 is similar to segment index 5 as illustrated by intersecting point 509, and segment index 2 is also similar to segment index 8, as illustrated by intersection 511.

Image 503 illustrates the segment-indexed cluster indicators produced according to the process of FIG. 6 and as illustrated in the segment level similarity matrix 501. The vertical column of image 503 represents the normalization value for each segment. Each segment is represented on the horizontal axis of 503 as segments 1-11. As can be seen by the dashed indicator lines 502, segment indexes 2, 5, and 8 are similar. Similarly, as can be seen by the double dashed lines 504, segment indexes 3, 6, and 10 are similar.

Summary Construction

In an embodiment, segments may be selected for summary construction by computing the column sum of Ss as a measure of the similarity of each segment to the remaining segments. For example, each segment index may be computed by:

$$f_1(j) = \sum_{i=1}^{P} S_S(i, j), j = 1, \ldots, P.$$

In an embodiment, each column represents a segment of the song of variable length.

In an alternative embodiment, segments may be selected based on its maximal off-diagonal similarity. This may be determined by calculating an index score for each segment:

$$f_2(j) = \max_{i=1,\ldots,P} S_S(i, j), j = 1, \ldots, P.$$

In another embodiment a two step approach is used. First, the dominant clusters are selected. Selection may be accomplished by selecting the clusters with maximal off-diagonal elements, combining segments from the same cluster to use a cluster-indexed analogue to (9). The corresponding clusters generally represent repeated segments of the audio file, such as a verse or chorus segment in a song. For each dominant cluster, the segment with the maximal value in the corresponding cluster indicator $\hat{u}_i$ of (7) is added to the summary. For dominant cluster i, this segment will have index $j_i^*$ such that $$j_i^* = \underset{j=1,\ldots,P}{\text{ArgMax}}\, \hat{u}_i(j).$$

An advantage to this approach is its flexibility in integrating structural information with other criteria. For example, representative segments for each significant (repeated) segment cluster could be included in the summary. Additionally, a subset of the segments that satisfies a temporal constraint could also be selected. Moreover, knowledge of the ordering of the segments and clusters, application-specific constraints, or user preferences may be included in the summarization process.

EXAMPLES

Below is an example of an embodiment of the present invention used to summarize the song "Wild Honey" by U2. The below description is intended for explanation purposes only and not intended to be limiting in any way. It is readily apparent that embodiments of the present invention may be used to generate summaries of a multitude of digital files and not just audio files.

Figure 7:
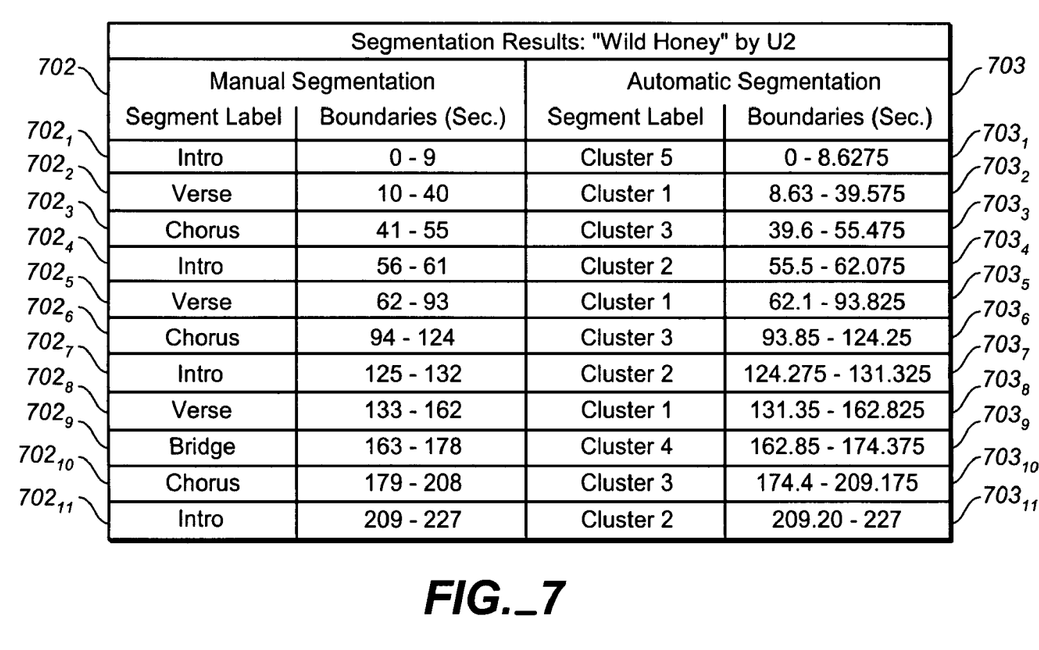

In generating a summarization, the song is first segmented. As discussed above, many different forms of segmentation may be used. For example, the song may be manually segmented or automatically segmented. FIG. 7 is a table illustrating segmentation results for the song Wild Honey. As illustrated in column 702, upon manual segmentation the song is divided up into eleven different segments $702_1, 702_2, 702_3, 702_4, 702_5, 702_6, 702_7, 702_8, 702_9, 702_{10}, 702_{11}$.

Column 703 illustrates the results from automatic segmentation of Wild Honey. Upon automatic segmentation the song is automatically segmented into eleven segments $703_1, 703_2, 703_3, 703_4, 703_5, 703_6, 703_7, 703_8, 703_9, 703_{10}, 703_{11}$. As can be seen, each segment varies in length with respect to other segments. Upon segmentation each segment is analyzed and clustered. Using the techniques described above, it is determined that segments $703_2, 703_5, 703_8$ are similar and are assigned to Cluster 1; segments $703_4, 703_7, 703_{11}$ are similar and assigned to Cluster 2; segments $703_3, 703_6, 703_{10}$ are similar and assigned to Cluster 3. Segments $703_1$ and $703_9$ are unique and assigned their own respective Clusters 5 and 4. As can be seen by comparison with the manual segmentation and identification, the segments have been properly clustered.

In the results, the clusters and manual labels agree with the sole exception of the first segment. In that segment, a distinctive guitar riff is shared between the segments of cluster 5 and cluster 2. In the first segment however, the riff is heard without the other instruments, causing it to be clustered as a unique segment.

A summary of the song may be created based on a user's needs. In this example, the user desires a small summary and so only one segment is included in the song summary. Alternatively, a representative segment from each cluster, or any combination of clusters, could be included in the summary. It will be understood that any combination of representative segments may be used in generating a summary.

Although headings have been used in this description, they are to serve as a guide to the reader only and should not be construed to limit the invention.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

The invention claimed is:

1. A method for automatically summarizing a digital file using self similarity analysis on one or more computers, according to selected criteria for determining representative segments, comprising the steps of:
   automatically segmenting said file into a plurality of segments, wherein the segments are selected using an incomplete time-indexed similarity analysis;
   comparing each segment to all other segments, wherein the segments are compared using a complete segment-indexed similarity analysis;
   based on the comparison clustering said segments into a plurality of clusters;
   selecting one or more clusters from said plurality of clusters wherein said selected clusters include segments representative of said digital file according to selected criteria for determining representative segments; and,
   providing one or more segments from said selected cluster as a summary of said digital file.

2. The method of claim 1, wherein said plurality of segments are of varying size.

3. The method of claim 1, wherein said step of clustering includes:
   calculating a similarity measure between each pair of segments comprised in said plurality of segments; and,
   clustering segments based on said similarity measures.

4. The method of claim 1, wherein said step of selecting a cluster from said plurality of clusters includes:
   selecting one or more clusters from said plurality of clusters, wherein each selected cluster includes segments representative of a portion of said digital file; and wherein said step of providing includes providing one or more segments from each of said plurality of selected clusters as a summary of said digital file.

5. The method of claim 1, wherein said digital file is an audio file.

6. The method of claim 1, wherein said digital file a video file.

7. The method of claim 1, wherein said digital file is a multimedia file.

8. The method of claim 1, wherein said digital file is a text file.

9. The method of claim 1, wherein segment boundaries are derived based on self similarity analysis of the segment.

10. The method of claim 9, wherein a similarity matrix is used for the similarity analysis to identify segment boundaries in order to segment the file into a plurality of segments.

11. A computer program product including an information storage medium wherein is stored information for programming a computer using self similarity analysis to:

automatically segment said file into a plurality of segments, wherein the segments are selected using an incomplete time-indexed similarity analysis;

comparing each segment to all other segments, wherein the segments are compared using a complete segment-indexed similarity analysis;

based on the comparison clustering said segments into a plurality of clusters;

select at least one cluster from said plurality of clusters wherein said selected clusters include segments representative of said digital file, according to selected criteria for determining representative segments; and provide at least one segment from said selected cluster as a summary of said digital file.

12. The computer program product of claim 11, wherein said file is segmented using a novelty score computed via kernel correlation along the main diagonal of an inter-frame similarity matrix.

13. The computer program product of claim 11, wherein said segments are clustered based on a Singular Value Decomposition.

14. The computer program product of claim 11, wherein said segments are of varying length.

15. The computer program product of claim 11, wherein said summary includes a plurality of segments, wherein each of said plurality of segments are selected from a different cluster.

16. The computer program product of claim 11 further including information for programming a computer to:

generate a similarity matrix of said plurality of segments.

* * * * *